Nov. 6, 1956 F. C. WILLIAMS ET AL 2,769,935

ELECTRONIC DIGITAL COMPUTERS

Filed May 31, 1950 4 Sheets-Sheet 1

Inventors
F. C. WILLIAMS
T. KILBURN
ATTORNEYS
Moore and Hall.

Nov. 6, 1956 F. C. WILLIAMS ET AL 2,769,935

ELECTRONIC DIGITAL COMPUTERS

Filed May 31, 1950 4 Sheets-Sheet 2

Inventors
F.C. WILLIAMS
T. KILBURN
ATTORNEYS
Moore and Hall

Inventors
F. C. Williams
T. Kilburn
Attorneys
Moore and Hall

Nov. 6, 1956 F. C. WILLIAMS ET AL 2,769,935

ELECTRONIC DIGITAL COMPUTERS

Filed May 31, 1950

4 Sheets-Sheet 4

Inventors
F. C. WILLIAMS
T. KILBURN

ATTORNEYS
Moore and Hall

United States Patent Office 2,769,935

Patented Nov. 6, 1956

2,769,935

ELECTRONIC DIGITAL COMPUTERS

Frederic C. Williams, Timperley, and Tom Kilburn, Northfield, Dewsbury, England, assignors to National Research Development Corporation, London, England Application May 31, 1950, Serial No. 165,262

Claims priority, application Great Britain June 7, 1949

3 Claims. (Cl. 315—20)

This invention relates to electronic digital computers employing an electrostatic storage device in which an insulator is scanned by an electron beam to set up electric charges representing the information to be stored, while subsequent scannings serve to regenerate the charges. Such a device is described in United States patent application Serial No. 790,879, filed December 10, 1947.

The present invention may employ electrostatic storage devices of various kinds including those in which words (i. e. numbers or instructions) are recorded as dot and dash distributions of electric charge as described in United States patent application Serial No. 50,136, filed September 20, 1948, and application Serial No. 447,866, filed August 4, 1954, which is a continuation of application Serial No. 124,577, filed October 31, 1949, now abandoned. In this system dot distributions are written or regenerated in a shorter time than dash distributions, because a dot is written or regenerated by a pause in the scanning process during which the electron beam is maintained switched on and stationary and is then switched off and the scanning action continued without again switching the beam on during the dash interval; whereas a dash is written or regenerated by forming a dot and then keeping the beam switched on for a suitable time during the subsequent scanning process. The reading or stored information takes place during the dot.

Now in computers of this kind when a dot is read from the store and passed to the computing circuit it may be required by the computer (when the result of a computation calls for a change to be made in the matter recorded) to be prolonged into a dash and as the computer circuits require a finite time to operate it may be that the instruction pulse from the computer which is intended to convert the dot to a dash will be available only after the time of reading and/or regenerating the dot has passed: in a practical embodiment this latter time was 2 microseconds. If the said instruction pulse arrives at the storage device too late it is ineffective in effecting the change from a dot to a dash. It has been found very difficult to reduce the delay in the computer circuits and in future with more complicated computer circuits the delays may be greater still. It is, therefore, desirable to make a longer time available for the working of the computer by making the time required for writing, reading or regenerating a dot greater than 2 microseconds but this in turn introduces a further deleterious effect which is known as Action Line Limitation. This effect is described, with other matters relating to the present invention, in a paper "A storage system for use with binary-digital computing machines" in Proceedings of the Institution of Electrical Engineers, vol. 96, part III, No. 40, p. 81 (March 1949). Briefly the effect relates to the interference of one line of stored information with neighbouring lines when a dot in the said line is illuminated for too long a period; for example, in the spacing that has been used, a time of illumination of about 2 microseconds is satisfactory but a greater time may lead to undesirable "cross-talk" between words stored on adjacent lines.

Now, as is explained in Ser. No. 50,136, filed September 20, 1948, and Ser. No. 447,866, filed August 4, 1954, which is a continuation of Ser. No. 124,577, filed October 31, 1949, now abandoned, and in the paper referred to above, the signal which is used to activate the computer circuits and the associated gates is the initial transient which arises when the cathode ray beam first impinges on the stored charge and the other part of the signal is unnecessary for the working of the device and it is now proposed, therefore, according to the present invention, to hold the beam stationary for a suitable period which may be longer than that hitherto used, and to switch off the cathode ray beam shortly after it impinges on each stored charge. Thus although the time for which the beam is held stationary may be so long that action line limitation would occur if the beam were maintained switched on, the beam is switched off before this effect occurs.

According to the present invention, therefore, in a digital computer there is provided an electrostatic storage device comprising an insulator arranged to be scanned by an electron-beam to set up at discrete areas on said insulator charge distributions representing information to be stored, the scanning action being such that pauses occur during which the said beam is held stationary, characterised by the provision of means for switching off the electron-beam for part of the durations of said pauses.

Other features of the invention will be apparent from the following description and from the appended claims.

The invention will now be described with reference to the accompaning drawings in which.

Figure 2:
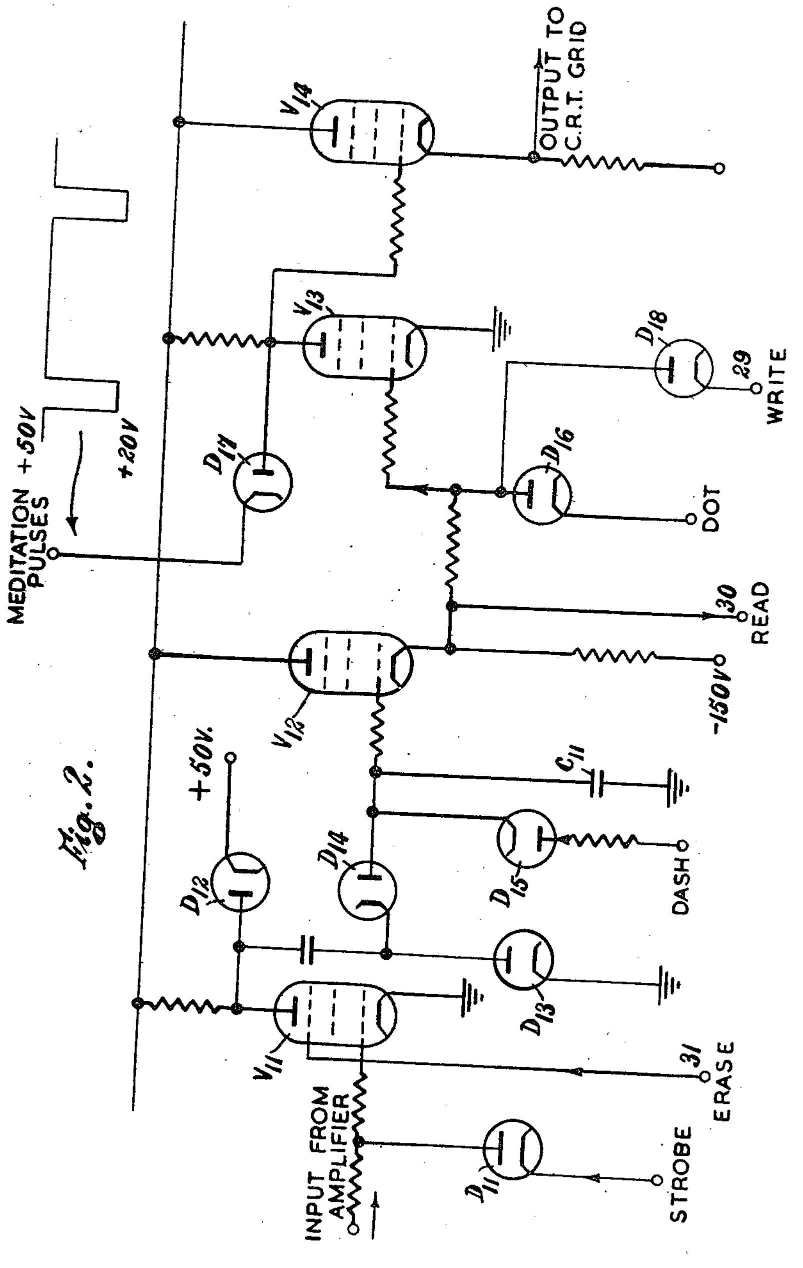
Figure 2 shows one circuit arrangement for carrying the invention into effect.
Figures 3, 4:
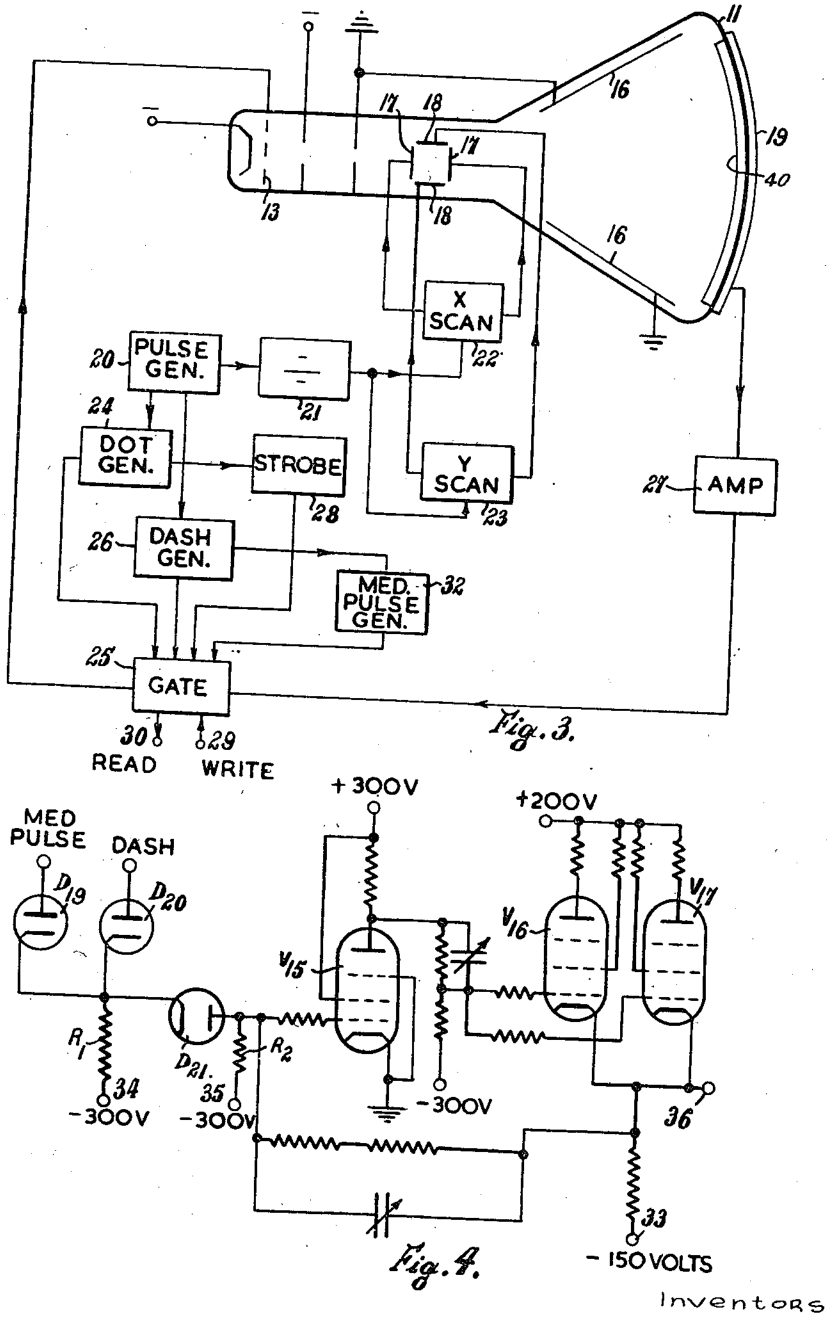
Figure 5:
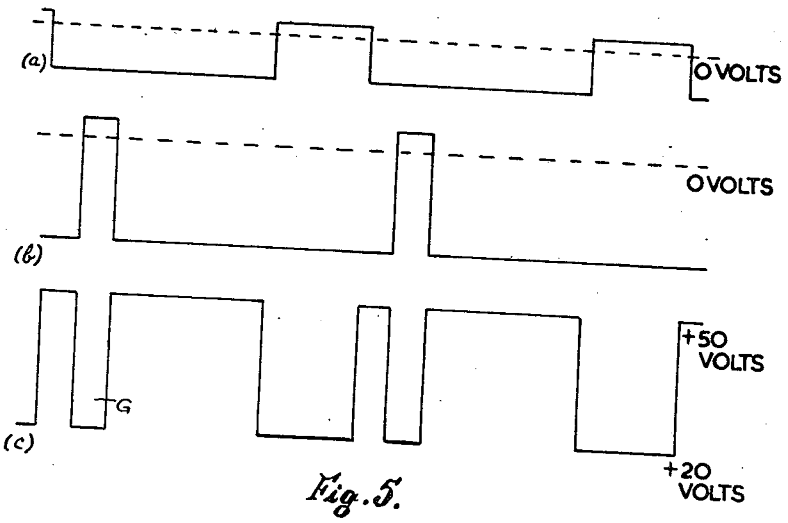
Figure 6:
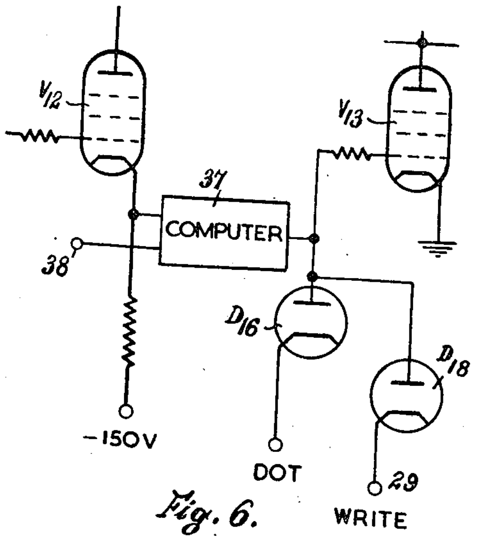

Figure 3 is a block circuit diagram of a storage device according to the invention showing how the circuit of Figure 2 may be combined as a gate with other parts, Figure 4 is a circuit diagram of a modification of part of Figure 2, Figure 5 is a diagram illustrating the operation of the circuit of Figure 4, and Figure 6 is a circuit diagram illustrating a modification of a further part of Figure 2.

Figure 1:
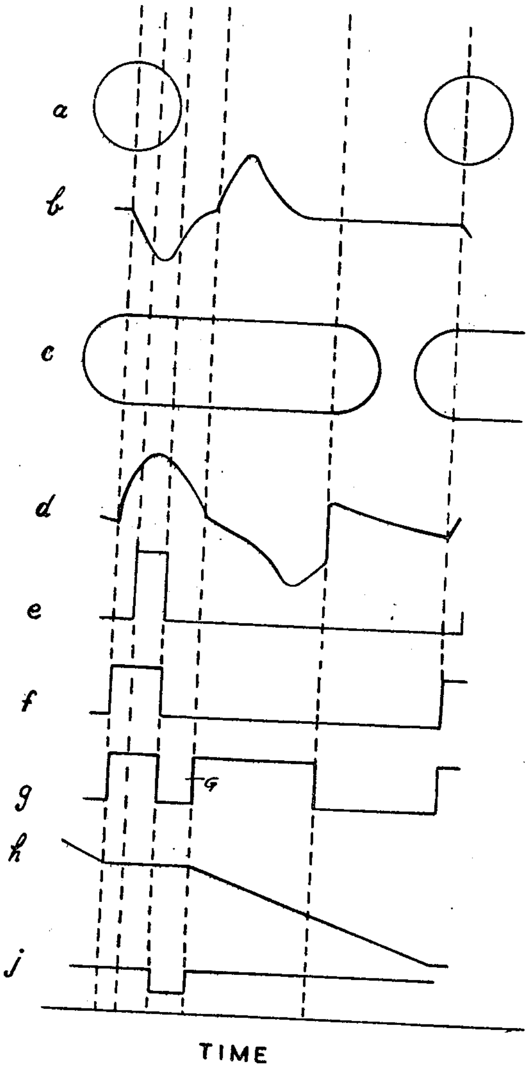
Figure 1 is a diagram used to explain the principle of the invention.

In Figure 1, there is shown at *a* a dot display and *b* represents the waveform of the signal obtained when this dot is scanned. In the same drawing *c* represents a dash display and *d* the waveform of signal obtained when this dash is scanned. Parts of the signal *b* and *d* are selected by a strobe pulse *e* and are passed to computing circuits from which a signal may be obtained signifying that the dot or dash may persist or must be changed.

While a dot (or the first part of a dash corresponding to a dot) is being scanned the electron beam is held stationary as represented by the level portion of curve *h* which is a deflection/time graph of the scanning motion. Hitherto the beam has been maintained switched on during the period of this pause in the scanning process but according to the present invention the beam is switched off after the required part of the response signal for the dot or dash scanned has been selected by the strobe pulse.

Thus *f* and *g* show the beam intensity when a dot and dash respectively are written or regenerated. It will be appreciated that the gap in curve *g* will not produce a spacial gap in the dash display because it occurs at a time when the beam is stationary.

The electron beam may be turned off by pulses called meditation pulses (so called because during these pulses the storage device is held in abeyance while the computer does its work) serving to produce the gap G in the dash waveform of Figures 1 (*g*) and 5 (*c*), the meditation pulses having the waveform shown in inverted sense in Figure 5 (*b*). The length of the meditation pulses will depend on the delay in the computer to be accommodated and the degree of action line limitation which, of course, in turn depends inter alia on the spacing of the charged areas in the store. The length of meditation pulses shown in the drawing is given merely by way of example.

One circuit for carrying out the invention is illustrated in Figure 2. This drawing shows a gate circuit for use with an electronic storage device.

Dot pulses which are negative-going from a resting level of about +5 volts are fed through a diode $D_{16}$ to the control grid of a valve $V_{13}$. During each pulse the anode current in this valve is cut off and the anode voltage rises until caught by a diode $D_{17}$ at a voltage which will be assumed to be +50 volts. The resulting pulse of anode voltage is applied to the control grid of a cathode-follower valve $V_{14}$ and the output voltage across the cathode load resistor of this valve is fed to the control grid of a cathode ray tube. In Figure 3, to be described more fully later, the circuit of Figure 2 has the reference 25, the cathode ray tube is 11 and the control grid thereof is 13. A charge pattern in the form of a display of dots is thus produced on the electric-charge retaining screen or storage element 40 of this tube.

If a positive pulse is generated at the output of the amplifier 27 of Figure 3 owing to the scanning of a dash upon the tube screen, the portion of the gate circuit of Figure 2 comprising valves $V_{11}$ and $V_{12}$ operates to extend the dot pulse on the control grid of the valve $V_{13}$ into a dash pulse. This is accomplished as follows. The output of the amplifier biased to about −15 volts is applied to the control grid of valve $V_{11}$ together with positive-going strobe pulses which are fed through a diode $D_{11}$ from a resting level of −10 volts. The anode current of $V_{11}$ is normally cut off and is switched on only when a positive pulse from the amplifier coincides with a positive-going strobe pulse. When this happens the negative pulse produced at the anode of $V_{11}$ is applied to the control grid of a cathode-follower valve $V_{12}$, the upper voltage limit of this grid being defined at zero volts by conduction of diodes $D_{13}$ and $D_{14}$ and the lower limit being defined by conduction of a diode $D_{15}$. Dash pulses which are negative-going from a resting level of about +5 volts are also fed to the control grid of the valve $V_{12}$. A condenser $C_{11}$ prevents the voltage on the control grid of valve $V_{12}$ from changing unless it is driven. Thus, in the presence of a dash voltage, the grid of valve $V_{12}$ is driven negative by the pulse from the anode of the valve $V_{11}$ and will, owing to the action of the condenser $C_{11}$, remain at −15 volts for a period, the dash period, determined by the dash voltage applied through diode $D_{15}$. When the dash ceases the grid of $V_{12}$ is driven to zero volts and remains at this voltage until it receives another negative pulse from the anode of $V_{11}$. The voltage across the cathode load of the valve $V_{12}$ is fed to the control grid of $V_{13}$ which is also being fed with dot pulses through diode $D_{16}$.

When, owing to the scanning of a dash pulse on the cathode ray tube screen, a negative pulse is produced across the cathode load resistor of $V_{12}$, the current in $V_{13}$ will be initially cut off by the dot waveform upon the grid of this valve and will be maintained cut off for a dash period. The voltage at the anode of the valve $V_{13}$ will therefore have the form of a dash. When a dot instead of a dash is scanned the anode voltage will be in the form of a dot.

The effect of this circuit is to provide the grid of the cathode ray tube normally with dot pulses and to prolong these pulses into dash pulses when necessary. The meditation pulses having the waveform indicated in Figure 2 and having upper and lower limits of 50 and 20 volts respectively are applied through a diode $D_{17}$ to thes anode of $V_{13}$ and thus to the grid of $V_{14}$. The timing of these pulses is such that shortly after the dot pulse at the cathode of $V_{14}$ has switched on the cathode ray beam a meditation pulse occurs and switches off the beam.

Referring in more detail to Figure 3, a pulse generator 20 produces regularly-recurring pulses which are used to synchronise the operation of all the correlated parts of the apparatus. These pulses are fed to a divider circuit 21 which counts down to provide synchronising pulses for the X time-base generator 22 and the Y time-base generator 23 which provide deflection voltages which are applied to the X and Y deflector plates 17 and 18 respectively to set up a raster of a number of horizontal lines. Between lines the cathode ray beam is switched off in known manner. The third anode 16 may be constituted by a conducting coating on the wall of the tube 11 and the pick-up plate is indicated at 19.

The pulse generator 20 also synchronises a dot pulse generator 24, a dash pulse generator 26 and a strobe pulse generator 28. A meditation pulse generator 32 is controlled by the dash pulse generator 26.

Signals to be written into the storage device may be applied at a terminal 29 and the signals in the device may be read at a terminal 30, these terminals also being shown in Figure 2.

It is desirable that the end of each dash should be defined in the waveform applied to the control grid of the cathode ray tube for all forms of write input to terminal 29 of Figure 2. Instead of applying the meditation pulses as shown in Figure 2, therefore, they may be applied as will be described with reference to Figure 4. The meditation pulses and the dash waveform are applied through diodes $D_{19}$ and $D_{20}$ respectively and through a diode $D_{21}$ to the control grid of a valve $V_{15}$. The anode of this valve is connected to the control grids of two valves $V_{16}$ and $V_{17}$ having a common cathode load. The cathodes of these valves are coupled back to the control grid of $V_{15}$. Owing to this feedback and the potentials maintained at the various terminals the control grid of $V_{15}$ remains substantially at earth potential.

The dash and meditation pulse waveforms applied through $D_{19}$ and $D_{20}$ are shown at *a* and *b* respectively in Figure 5, the former being in negative-going and the latter in positive-going sense. Terminals 33, 34 and 35 are maintained at stable potentials of −150, −300 and −300 volts respectively, the anode of $V_{15}$ is taken to +300 volts and the anodes of $V_{16}$ and $V_{17}$ are taken to +200 volts. The arrangement is such that if diode $D_{21}$ is insulating, current from terminal 33 flows through a grid leak $R_2$ to terminal 35 while if the diode $D_{21}$ is conducting current flows from terminal 33 through two grid leaks $R_1$ and $R_2$ in parallel to terminals 34 and 35. The effect is, therefore, that when either or both of the waveforms of Figures 5 (*a*) and (*b*) are positive, the diode $D_{21}$ is cut off, only one leak, namely $R_2$, is effective, and the voltage at terminal 36 is a minimum, in this case 20 volts, owing to the relatively small current in the cathode load resistor of valves $V_{16}$ and $V_{17}$. When both waveforms are negative, both leaks $R_1$ and $R_2$ are operative and the voltage at terminal 36 rises to 50 volts. The terminal 36 may be connected to the cathode of diode $V_{17}$ in Figure 2, and the waveform at this terminal is indicated at (*c*) in Figure 5.

It will be appreciated that in the absence of a dash input through diode $D_{18}$ or of a positive transient from the amplifier applied to the control grid of $V_{11}$, the valve $V_{13}$ remains conducting excepting during dot pulses and the 50-volt pulses applied through diode $D_{17}$ have the effect of switching off the beam for the latter part of the duration of each dot pulse.

Figure 6 shows how the gate circuit of Figure 2 may be linked with the computer whereby information can be fed from the storage device to the computer and the stored information can be changed on instructions from the computer determined by the result of a computation performed between the stored information and information applied from another storage device or other source through terminal 38. In Figure 6 only the part of Figure 2 around and including the valves $V_{12}$ and $V_{13}$ is shown, the remainder of the circuit being assumed to be as shown in Figure 2. It will be seen that the computer 37 is connected, in place of a resistor of Figure 2, between the cathode of valve $V_{12}$ and the control grid of valve $V_{13}$.

An important feature of the gate circuit of Figure 2 is the facility to erase the stored information, by which is meant converting all charges to dots. This is done by breaking the regeneration loop between the pick-up plate 19 of Figure 3 and the control grid 13 of the tube 11. If this facility were not provided, on starting up the apparatus without feeding in any information there would be a tendency to produce dots but this tendency would be over-ridden because a freshly produced dot gives rise to a positive transient in the pick-up plate and this regenerates a dash. By momentarily breaking the loop, however, this over-riding is prevented and dots are stored on the screen, and after closing the loop regenerated, until information is written in requiring some of the dots to be changed to dashes.

In the circuit of Figure 2, erasing is effected by applying such a negative potential at terminal 31 and thus is to the suppressor grid of valve $V_{11}$ as to cut off this valve.

Although the invention has been described with particular reference to storage by the dot and dash method, it is not so limited. It is applicable, for example, to arrangements in which one digit is stored by directing a defocused beam upon a region of the screen and then extinguishing the beam and another digit is represented by focusing the beam sharply before it is extinguished. Such arrangements are described in the specification of United States Serial No. 124,192, filed October 28, 1949. The meditation pulse may be arranged to switch off the beam after the beam has bombarded the screen for a short time in its defocused condition and to switch on the beam before or during the time in which it is controlled to the focused condition.

We claim:

1. In a digital computer, a storage device comprising an electric charge-retaining element, electron gun means including control means directing a beam of charged particles on said element to develop electrostatic charges on said element, deflecting means causing said beam to scan said element, means for generating and applying to said deflecting means a voltage having a waveform including progressively changing portions separated by portions of constant value whereby the beam is caused to pause for recurrent intervals of time during said scan, a pick-up plate adjacent said element to detect changes in said electrostatic charges, a dot pulse generator coupled to said control means to increase the intensity of said beam during a portion of said intervals, a dash pulse generator for generating pulses of greater duration than said dot pulses, means coupled to said control means and responsive to certain detections of said pick-up plate to extend the effect of any of said dot pulses to maintain the beam at said increased intensity for the period of a dash pulse in order to regenerate said charges, and a further pulse generator coupled to said control means for reducing the intensity of said beam during a predetermined portion of each of said intervals of time.

2. In a digital computer, an electrostatic storage device comprising an electric charge-retaining screen, means including intensity control means for directing an electron beam on said screen to develop electrostatic charges on said screen, means for deflecting said beam relatively to said screen, means for generating and applying to said deflecting means a voltage having a waveform including progressively changing portions separated by portions of constant value whereby the beam is scanned over said screen and caused to pause during recurrent intervals, a pick-up plate mounted adjacent said screen to develop voltages corresponding to changes in said electrostatic charges, a dot pulse generator means connected to the means for directing the electron beam for applying dot pulses from said generator thereby to switch said beam on during said intervals, a dash pulse generator for generating pulses of greater duration than said dot pulses, means connected to the means for directing the electron beam and controlled by said voltages from said pick-up plate to extend when appropriate the effect of any of said dot pulses to maintain the beam switched on for the period of a dash pulse in order to modify the charges produced by said dot pulses, a further pulse generator, and means connected to the means for directing the electron beam for applying pulses from said further generator to switch said beam off before the end of said intervals.

3. The method of storing information as a plurality of electrostatic charges on a storage element which comprises the steps of scanning the said element with an electron beam, periodically halting said scanning for predetermined intervals of time, reducing the intensity of said electron beam subsequent to the beginning of each of said halted intervals and increasing the intensity of said beam not later than the end of said halted intervals.

References Cited in the file of this patent

UNITED STATES PATENTS

| | | |
|---|---|---|
| 2,059,004 | McLeeds | Oct. 27, 1936 |
| 2,093,157 | Nakashima et al. | Sept. 14, 1937 |
| 2,476,167 | Wendt | July 12, 1949 |
| 2,477,008 | Rosen | July 26, 1949 |
| 2,514,079 | Lockhart | July 4, 1950 |
| 2,642,550 | Williams | June 16, 1953 |